UNITED STATES PATENT OFFICE 2,654,677

MOTHPROOFING AGENT AND MATERIAL CONTAINING THE SAME

Ida Marie Rasmussen, New Brunswick, and Edward F. Rogers, Middletown, N. J., assignors to Merck & Co., Inc., Rahway, N. J., a corporation of New Jersey No Drawing. Application December 1, 1950,
Serial No. 198,746

6 Claims. (Cl. 117—138.5)

This invention relates to new chemical compounds, and more particularly to new derivatives of halogenated benzene sulfonamides. Specifically, it relates to bis(p-halogen-benzene-sulfonyl)methylene diamines, processes for preparing these compounds, and insecticidal compositions containing these new compounds.

In accordance with the present invention, it is now found that valuable new chemical compounds are obtained by condensing halogenated benzene sulfonamides with formaldehyde. It is one object of our invention to provide these valuable chemical compounds. Another object is to provide a process whereby these products may be readily prepared. A further object is to provide new insecticidal and mothicidal compositions containing these new products. Other objects will be apparent from the detailed description hereinafter provided.

The new chemical compounds of our invention may be represented by the formula:

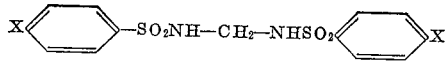

wherein X is chlorine or bromine. These new compounds are conveniently obtained by reacting the corresponding p-halogenated benzene sulfonamide with formaldehyde. These new compounds are white crystalline products which are insoluble in water, and soluble in alcohol and most of the common organic solvents.

In accordance with one embodiment of our invention we have found that these products are most readily prepared by intimately contacting the p-halogenated sulfonamide with formaldehyde in an aqueous alkali medium. This reaction may be represented as follows:

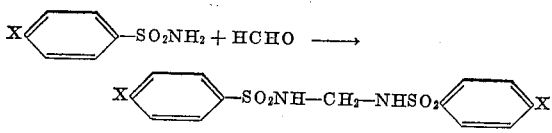

wherein X is bromine or chlorine. In carrying out this reaction we have obtained high yields of the desired product by effecting the condensation in a hot aqueous alkaline medium having a pH of about 8.0. In general, we find that any inorganic alkali (inter alia, sodium or potassium hydroxide, calcium hydroxide, disodium phosphate, sodium or potassium carbonate, sodium or potassium bicarbonate, and the like) is suitable for adjusting the pH of the aqueous medium to the desired level.

The condensation products of our invention are obtained in solid form by cooling the resulting reaction medium thereby causing the product to precipitate in crystalline form. The precipitated product is then recovered and dried in accordance with conventional chemical practice. Although the product so obtained is substantially pure and satisfactory for most uses, if desired, further purification can be effected by recrystallizing it from a suitable solvent such as ethanol.

Pursuant to a further embodiment of our invention, we have found that the compounds of our invention are effective insecticides which are particularly valuable in protecting organic material susceptible to attack by insect pests such as the webbing clothes moth or black carpet beetles. Thus, bis(p-chloro-benzene sulfonyl)methylene diamines or bis(p-bromo-benzene sulfonyl)methylene diamines may be used either alone or in combination with other insecticidally active compounds and a suitable carrier therefore, may be applied to materials subject to such insect attacks by spraying, dusting, pouring, dipping, etc., in the form of solutions, suspensions, powders, and the like containing the active principle in optimum concentration for the particular purpose at hand.

For example, these products can be dissolved in a suitable solvent or mixture of solvent in optimum concentrations with respect to particular purpose for which it is to be used and for the material to be protected. Suitable solvents include alcohol, esters, petroleum fractions, ketones, and the like.

Further, they can be suspended in suitable vehicles or combination of vehicles in accordance with the accepted practice in the art. For example, they can be suspended in aqueous mediums which in addition may contain various wetting and spreading agent or other insecticidally active compounds.

They may be also used in the form of a dusting powder wherein the compounds are mixed with or absorbed on finely divided carriers such as volcanic ash, kieselguhr, carbon, bentonite, fuller's earth, nut shell flours, talc, and the like.

In general, the active agent of our invention may be formulated in a wide variety of carriers containing various agents such as may be best suited for the control of a particular pest. Thus, compositions are prepared with these active materials in a suitable state of subdivision and association which will be most effective for the particular purpose at hand.

Bis(p - chloro - benzene-sulfonyl)methylene diamine and bis(p-bromo benzene-sulfonyl)-methylene diamine are particularly effective in protecting organic materials such as woolens, furs, feathers, and the like, against textile pests such as webbing clothes moth or black carpet beetle. We have found that the application of a small quantity of these compounds to such materials affords good protection from the ravages of these insects. While, as indicated previously, the optimum amounts of these compounds used will depend upon the material and the insect from which it is to be protected; in general we find that amounts of less than 1% are sufficient to afford satisfactory protection. Even with concentrations of the active ingredient as low as ¼%, it is observed that woolen material is amply protected from the ravages of the common moth. The active principles are most conveniently applied to fabrics and the like in the form of a solution in the organic solvents such as acetone, alcohol, chlorinated solvents, benzene, and the like.

The following examples are presented to illustrate specific embodiments of our invention.

Example 1

About 0.004 mole of the p-chloro or p-bromo sulfonamide is dissolved in 100 ml. of boiling water. To the resulting hot solution is added 1 ml. of 37% aqueous formaldehyde and 1.5 ml. of a saturated aqueous solution of disodium phosphate. The pH of the resulting solution is approximately 8.0. The solution is then filtered and the filtrate cooled in the icebox for several hours. The compounds precipitate in crystalline form, are washed with water and dried. If desired, they may be further purified by recrystallization from ethanol.

The bis(p-bromo-benzene-sulfonyl)methylene diamine prepared in this manner was found to melt at 136° C. Analysis, calculated for $C_{13}H_{12}O_4N_2S_2Br_2$ 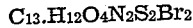

C, 32.23%; H, 2.37%. Found: C, 32.24; H, 2.50%.

The bis(p-chloro-benzene-sulfonyl)-methylene diamine prepared in the same way was found to melt at 132° C. Analysis, calculated for $C_{13}H_{12}O_4N_2S_2Cl_2$ 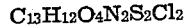

C, 39.50%; H, 3.06%; N, 7.09%. Found: C, 39.63%; H, 3.28%; N, 7.33%.

The above reactions were also carried out using 1.5 ml. of a saturated aqueous solution of sodium carbonate in place of the disodium phosphate solution.

Example 2

The compounds prepared as described in Example 1 were tested for protection of wool against textile pests by the method of R. E. Heal (J. Econ. Entomology, 35, (2) 249-52 (1942)), which may be summarized as follows:

Woolen fabric is impregnated with an acetone solution of the compound to be tested to give known concentrations on the fabric. After evaporation of the solvent, 10 larvae of the webbing clothes moth (*Tineola biselliella* Hum.) or of the black carpet beetle (*Attagenus piceus* Oliv.) are confined on weighed patches of the treated fabric for 2 weeks. After removal of the larvae the patches are again weighed. The loss in weight of the fabric is indicated as "damage." Weight loss greater than 10 mgm. is considered to be inadequate protection.

The following results were obtained by this method:

| Compound | Concentration on Wool in Percent | Mg. damage by Webbing clothes moth | Mg. damage by Black Carpet Beetle |
|---|---|---|---|
| p-chloro compound | 0.5 | 3.8 | 2.1 |
|  | 0.25 | 5.4 | 6.6 |
|  |  | 70.5 | 41.1 |
| Control (wool) p-bromo compound | 2.0 | 2.6 | 1.9 |
|  | 1.0 | 4.7 | 2.0 |
|  | 0.5 | 7.9 | 6.6 |
| Control (wool) |  | 45.5 | 20.0 |
| N-methyl-(3, 4-dichloro)benzene sulfonamide (Commercial mothproofing compound) | 2.0 |  | 17.3 |

Various changes and modifications in the foregoing procedure will occur to those versed in the art, and to the extent that such changes and modifications fall within the purview of the appended claims it will be understood that they constitute part of our invention.

We claim:

1. A compound of the formula:

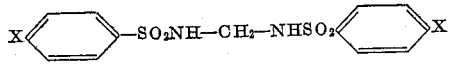

wherein X is a halogen selected from the group consisting of chlorine and bromine.

2. Bis(p-chloro-benzene-sulfonyl)methylene diamine.

3. Bis(p-bromo-benzene-sulfonyl)methylene diamine.

4. An organic material susceptible to attack by textile insect pests having incorporated therein a compound selected from the group consisting of bis(p-chlorobenzene-sulfonyl)-methylene diamine and bis(p-bromobenzene-sulfonyl)-methylene diamine.

5. A fabric susceptible to attack by textile insect pests having incorporated therein a compound selected from the group consisting of bis(p-chlorobenzene-sulfonyl)-methylene diamine and bis(p-bromobenzene-sulfonyl)-methylene diamine.

6. A woolen fabric susceptible to attack by textile insect pests having incorporated therein a compound selected from the group consisting of bis(p-chlorobenzene-sulfonyl)-methylene diamine and bis(p-bromobenzene-sulfonyl)-methylenediamine.

IDA MARIE RASMUSSEN.
EDWARD F. ROGERS.

References Cited in the file of this patent

UNITED STATES PATENTS

| Number | Name | Date |
|---|---|---|
| 1,962,276 | Huismann et al. | June 12, 1934 |
| 2,445,319 | Engelbrecht | July 20, 1948 |
| 2,545,174 | Sido | Mar. 13, 1951 |

FOREIGN PATENTS

| Number | Country | Date |
|---|---|---|
| 464,660 | Great Britain | Apr. 22, 1937 |
| 602,259 | Great Britain | May 24, 1948 |